Aug. 21, 1934.   M. P. LAURENT   1,971,159
FLOW NIPPLE
Filed Feb. 12, 1932
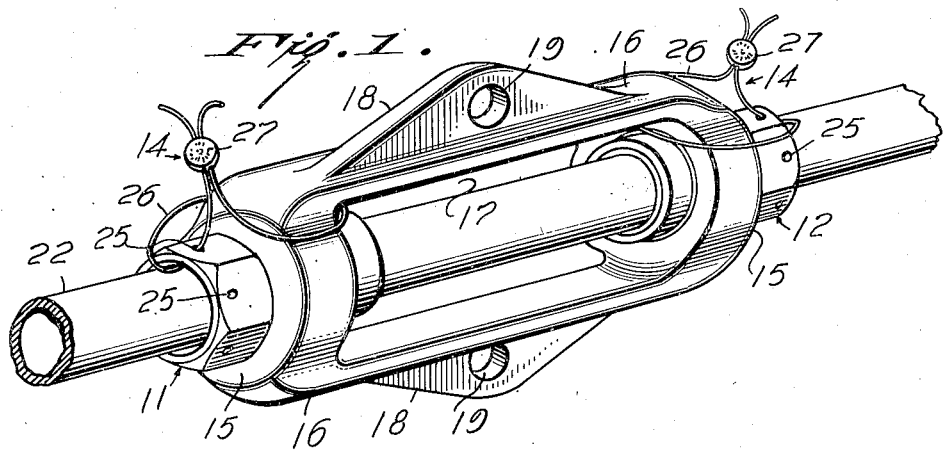
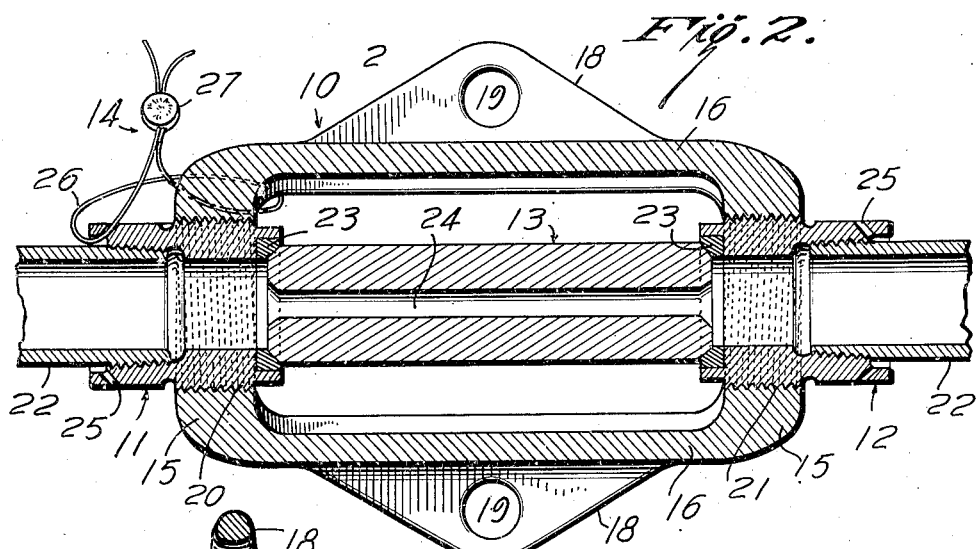
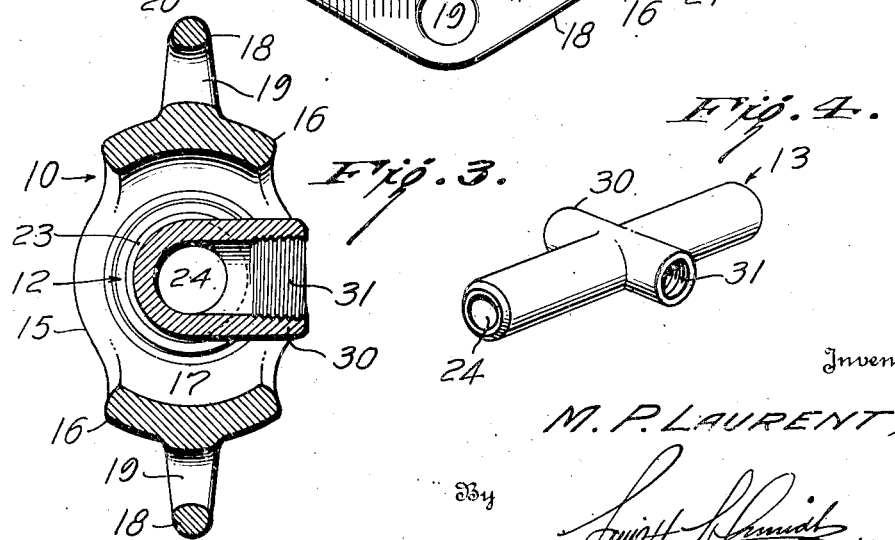
Inventor
M. P. LAURENT,
By
Attorney Patented Aug. 21, 1934

1,971,159

UNITED STATES PATENT OFFICE 1,971,159

FLOW NIPPLE

Milton P. Laurent, Houston, Tex.

Application February 12, 1932, Serial No. 592,636

2 Claims. (Cl. 137—75)

This invention relates, generally, to devices which are adapted to be introduced into a pipe line where it is desired to control the flow of fluid, and particularly to a readily operable frame for the replaceable flow nipple in connection with oil wells.

It is a well known fact in this art that the pressure of oil flow through the flow nipple, or beans, is not uniform. Some wells vary from an exceedingly high velocity to a pressure of much reduced proportions. It is highly desirable to restrain and control this pressure sufficiently to prevent the sanding up of the well, which would occur should the flow be permitted under full pressure. The usual procedure is to frequently interchange this flow nipple with others of various sizes of bores, consistant with the varying conditions at the well.

Whether the changing of the bean is occasioned by wear of its bore or by the varied oil flow, the task is usually a difficult one and involves a considerable loss since the flow of oil must be interrupted. Usually, two men with special tools are required to effect the removal and replacement of the bean from its support in the pipe line. Obviously, great care must be taken to thoroughly clean the usual flow bean of mud or gumbo and gritty material before the nipple can be removed for interchanging, as the deposit of this foreign matter upon their mating or connecting portions will not permit a tightly sealed joint. Naturally, this condition is aggravated in the types of flow beans wherein a close or sliding fit must be resorted to between the bean and its support, where packing glands are employed, and/or when the bean is threaded into its housing.

Since the interior condition of the beans in usual practice cannot be determined by an outward examination, their removal frequently disclose, either a bore worn beyond a point of efficiency or not sufficiently worn to warrant change. Then, too, the oil flow is often unnecessarily interrupted by the tampering of the flow beans by unauthorized persons.

To eliminate the above and other disadvantages incidental to flow beans of the usual type, my invention has for one of its principal objects the provision of an extremely simple and highly effective device which is constructed of the minimum number of parts, which may be separated and assembled, as, for example, when replacing its respective bean, in a comparatively short period of time and without the aid of any special tools, or the requirement of previous skill.

Another object of the invention is to provide the bean supporting frame with a pair of similarly formed ends and winged connecting arms in a manner as to permit a comparatively large clearance space for the passage of the bean, thereby facilitating the removal or replacement of the bean.

It is a further object of the invention to construct the bean in such a novel manner as to permit the diversion of the oil flow from the main line.

A further object of my invention resides in a combined locking and sealing means which not only prevents the accidental loosening of the assembled flow bean but serves as a visible record upon which may be impressed the date of its installation and further serving as a warning against unauthorized tampering.

Other objects of this invention will be hereinafter set forth, or will be apparent from the description and the drawing, in which is illustrated one embodiment of a device for carrying out the invention.

The invention, however, is not intended to be restricted to the particular constructions, nor to the particular application of such construction, herein shown and described, nor to the various details thereof, as the same may be modified in various particulars or be applied in many varied relations without departing from the spirit and scope of the invention, the practical embodiment herein illustrated and described being merely an attempt to show one of the various possible forms in which the invention might be embodied.

On the drawing, in which the same reference characters refer to the same parts throughout, Figure 1 is a view in perspective of a portion of a pipe line illustrating my improved flow bean in its fastened and sealed position;

Figure 2 is a longitudinal sectional view thereof;

Figure 3 is a transverse sectional view taken through Figure 2, and

Figure 4 is a detail perspective view showing the flow nipple with a pair of side outlets, as a cross.

My invention, in the form or embodiment shown in the drawing and briefly described, comprises a supporting frame indicated generally as at 10, a pair of oppositely disposed and aligned sleeves, 11 and 12, a flow nipple or bean, 13, and means for sealing and preventing displacement of the sleeves with respect to the supporting frame, 10, shown as at 14.

The supporting frame, 10, which is preferably formed by casting or forging is provided with a pair of substantially circular end members, 15, and longitudinally extending connecting arm portions, 16. These arm portions, which are arcuate in cross section as is clearly shown in Figure 3 for the purpose of desirably strengthening them, suitably merge with the end members and permit the provision of a comparatively wide space, or opening, 17, between them.

Since the length of the opening, 17, is slightly greater than the length of the flow nipple, 13, and the width thereof is substantially twice the diameter of the flow nipple, it will be obvious that the removal and the insertion of the flow nipple into and out of its aligned or seated position will be readily facilitated.

Outwardly extending ribs or winged members, 18, are integrally formed with the connecting arms, 16, and are each provided with an opening, 19, extending transversely through the centers thereof.

The end portions, 15, are provided with centrally disposed and reversely threaded openings, 20 and 21, of uniform diameter, for the purpose of receiving the sleeves, 11 and 12. The outer ends of these sleeves, 11 and 12, are internally screw threaded and adapted to be secured upon the ends of the fluid-way members or pipes, 22, which constitute the pipe line. I have found it desirable to form the outer ends of the sleeves with polygonal faces, which facilitates their being readily secured to their respective pipe ends. It may be here stated that since each of the sleeves, 11 and 12, are tightly secured upon their respective pipe ends, 22, their outer cylindrical and reversely threaded portions serve as the pipe ends. It will be appreciated that the threaded openings, 20 and 21, within the supporting frame, 10, are formed with sufficient clearance to permit the rotation of the supporting frame along the externally threaded portions of the sleeves, 11 and 12.

The inner or opposing ends of the sleeves, 11 and 12, are suitably counterbored for the purpose of permanently receiving rings or washers, 23. These rings are preferably formed of metal comparatively softer than the flow nipple, such as brass or the like, and are each provided with angular or tapering seat portions.

As is well known in this art, flow nipples are constructed of hardened steel and provided with bores of various diameters, which are adapted to be either replaced by reason of the wear of the bore or to be interchanged due to a varied flow condition of the well.

Referring particularly to Figure 2 of the accompanying drawing, it will be noted that the flow nipple, 13, is in alignment with the sleeves, 11 and 12, and their respective pipe sections, 22, when in its seated position. I have found it desirable to circumferentially bevel each end of the flow nipple, 13, so that an effective sealing connection will be readily obtained between each of the ring seats, 23, and the adjacent ends of the flow nipple, 13. By forming the ends of the flow nipple, 13, and the contacting seat portions of the rings, 23, identically angled, they may be readily interchanged with positive assurance of an effective sealing action.

Although I have found it desirable, in the usual installation, or as shown in Figure 2, to employ a flow nipple having a bore comparatively smaller than the bores of the pipes, 22, and their associated sleeves, 11 and 12, occasion frequently arises when it would be desirable to relieve the pressure through the flow nipple by diverting it. The attainment of this object, therefore, may be readily accomplished by means of the novel construction of my fluid controlling device.

The provision of a supporting member having a comparatively large opening, 17, already described, readily permits the use of a flow nipple having one or more side outlets as is clearly shown in Figures 3 and 4. In Figure 3 is illustrated a flow nipple, 13, serving as a T, having a single side outlet, 30, which is screw threaded as at 31, for receiving a standard pipe, whereas Figure 4 illustrates a flow nipple, 13, serving as a "cross" in which a pair of oppositely disposed side outlets, 30, having internally threaded openings, 31, are provided.

A plurality of angularly disposed openings, 25, are formed near the outer edges of the sleeves, 11 and 12, for the purpose of permitting the insertion of the metallic wires, 26, constituting the seals, 14. It will be appreciated that when my improved device has been fully assembled and ready for use, it is merely necessary to pass these wires, 26, around one of the connecting arms, 16, and then insert it through one of the openings, 25, whereupon the free ends of the wire, 26, are secured toegther by means of the seals, 27. These seals may, of course, be impressed with indicia indicating the particular operator and the date upon which the assembly was completed. The wires, 26, are preferably drawn sufficiently tight before they are twisted or sealed so as to prevent the sleeves from becoming loosened due to vibration or the like.

Having thus described the details of construction of the invention, the operation thereof will be readily understood. When it is desired to install or connect my fluid controlling device into a pipe line, it is merely necessary to tightly secure the sleeves, 11 and 12, upon the adjacent ends of the pipes, 22. The substantially hollow or turnbuckle frame is then turned axially about the center of the sleeves, 11 and 12, until the threaded openings 20 and 21, engage the threads upon the outer face of the sleeves for a relatively short distance. The flow nipple, 13, may now be readily inserted through either side of the turnbuckle frame until it substantially aligns with the center thereof. It is now but necessary to continue the turning movement of the hollow frame, 10. This will, of course, tend to move the oppositely disposed sleeves 11 and 12, together with their attached pipe sections 22, toward the ends of the flow nipple 13, until it is firmly seated. In order to more firmly effect the seating engagement between the ends of the flow nipple and the sleeves to effect a leak-tight joint, either of the wings may be tapped with a hammer, or a rod or bar may be inserted through either of the openings 19, formed in the winged connecting arms 16.

It will be readily obvious that when it is desired to remove the flow nipple, as for inspection or replacement, it will be simply necessary to clip the wires, 26, and rotate the hollow frame in the reverse direction, or until the ends of the flow nipple have been disengaged from their ring seats, 23, whereupon the flow nipple will become completely disengaged from its seats.

It may be here stated that when the flow nipple is removed the inner or opposing ends of the sleeves are withdrawn into the hub or end portions, 15, of the frame 10, thereby completely shielding the seated ends, eliminating the possibility of the deposit of gritty or foreign matter thereon.

While I have necessarily described the preferred embodiments of my invention somewhat in detail, it is to be understood that I may vary the size, shape and arrangement of parts comprising the structures within wide limits without departing from the spirit of the invention.

What I claim is:

1. A fluid controlling device, comprising a supporting frame having spaced ends and side connecting arms providing a substantially rectangular passageway therebetween, each of said connecting arms having integrally formed and outwardly extending apertured lugs, the ends adapted to receive fluid inlet and outlet connections respectively, and a removably mounted nipple adapted to pass freely through said rectangular passageway.

2. A fluid controlling device, comprising an inlet and outlet pipe, a supporting frame having a pair of aligned and oppositely threaded openings, a flow nipple, and a pair of oppositely threaded sleeves, one secured upon each of said pipes and located within its respective threaded opening in the supporting frame, said supporting frame being revolubly mounted upon the oppositely threaded sleeves for effecting the lengthwise movements of the sleeves to and from said flow nipple.

MILTON P. LAURENT.